United States Patent [19]

Cove

[11] Patent Number: 4,541,295
[45] Date of Patent: Sep. 17, 1985

[54] VALVE ACTUATOR HAVING A ROTARY BI-DIRECTIONAL APPARATUS WITH A DUAL RATCHET MECHANISM

[75] Inventor: Harry R. Cove, Carson, Calif.

[73] Assignee: Hydril Company, Los Angeles, Calif.

[21] Appl. No.: 558,714

[22] Filed: Dec. 7, 1983

Related U.S. Application Data

[63] Continuation of Ser. No. 217,857, Dec. 18, 1980, abandoned.

[51] Int. Cl.$^4$ .................... F16H 27/02; F16K 31/52
[52] U.S. Cl. .................................. 74/142; 74/151
[58] Field of Search .................. 74/151-153, 74/142

[56] References Cited

U.S. PATENT DOCUMENTS

| | | | |
|---|---|---|---|
| 1,541,876 | 6/1925 | Victorsohn | 74/151 |
| 4,180,238 | 12/1979 | Muchow | 74/128 |

*Primary Examiner*—Lawrence J. Staab
*Attorney, Agent, or Firm*—Dodge & Bush

[57] ABSTRACT

A rotary bi-directional valve actuator having a new and improved dual ratchet mechanism. The linkage maintains the pawl disengaged or uncoupled from the drive bushing until operated to protect the ratchet mechanism and to prevent its binding or jamming. The disengagement of the mechanism compensates for inadvertent rotational movement of the valve stem which could result in malfunction or damage to the actuator when actuated. The actuator is extremely rugged and durable in construction for a long operating life. The simplified construction of the actuator is also easy to maintain and easy access to the working parts is provided by the sealed housing.

3 Claims, 2 Drawing Figures

VALVE ACTUATOR HAVING A ROTARY BI-DIRECTIONAL APPARATUS WITH A DUAL RATCHET MECHANISM

This application is a continuation of application Ser. No. 217,857, filed 12-18-80, now abandoned.

TECHNICAL FIELD

The present invention relates to actuators for valves and more particularly to a bi-directional valve stem rotating actuator apparatus having a fluid power system.

CROSS-REFERENCE TO RELATED APPLICATION

This application is an improvement of the invention disclosed in U.S. Pat. No. 4,180,238 which patent is hereby totally incorporated herein along with all other herein mentioned U.S. Patents as if they were fully set forth as written disclosure.

DESCRIPTION OF THE PRIOR ART

U.S. Pat. No. 3,748,915, entitled "Multiposition Bi-Directional Rotary Means for a Switch or the Like," issued to Ronald C. Winter and Enno A. Knief on July 31, 1973, teaches a multiposition bi-directional rotary means for a switch which includes a rotary ratchet operated by two actuating push levers. Two advance levers or pawls are slidably and pivotally mounted and engage this ratchet from opposite radial directions. Each advance lever has means for engaging the ratchet to rotate the ratchet one step to an adjacent position and means to engage the ratchet and releasably hold it in a position. One lever rotates it in one direction; the other lever rotates it in the opposite direction. A single spring engages both advance levers to urge them radially inward toward the ratchet. Other springs urge the advance levers or pawls tangentially of the ratchet toward projected at-rest positions. The push levers have projections to engage the advance levers for effecting lineal sliding movement and permitting pivoting of such advance levers relative to the ratchet and the push levers.

U.S. Pat. No. 3,626,452 shows and describes multipositioned bi-directionary rotary means for a switch or the like which utilizes independent slidably and pivotally mounted spring biased actuating levers or pawls. This patent, however, does not teach or disclose the use of a single C-shaped spring which urges such actuating levers or pawls radially inwardly toward the rotary ratchet. Neither does this patent utilize a ratchet engaging shape on the actuating levers or pawls which engages two teeth spaced by a third tooth on the ratchet to provide the locking means by one pawl during the retracting action of the other pawl from its ratchet advance position.

U.S. Pat. No. 3,768,775, entitled "Portable Valve Actuator," issued to Monte B. Archer on October 30, 1973, and discloses a portable valve actuator.

U.S. Pat. No. 3,203,266, entitled "Valve Mechanisms," issued to Robert S. Willis and William J. Baker on Aug. 31, 1965, teaches a valve operator for a valve mechanism having a movable valve member, wherein the operator comprises means connected to and moving the valve member by repeated movements of predetermined amount. In case the valve is of the rotary type in which the movement of the valve itself is reversed in moving from closed to opened position and back to closed position, the valve driving member of the valve operator is moved in either one of two directions. The repeated movements being preferably equal and each of a predetermined amount, the algebraic sum of the number of such movements may be used as an indicator of the valve position making possible the location of the indicator at a position remote from the valve installation.

It is a serious problem in certain types of valves including those of the rotary type, particularly when they are remotely controlled or power operated, to set them at a desired operating position between the fully opened and closed positions. In each of the latter positions, it is possible to have stop means limiting the valve movement so that the valve stops at a known position in which it is fully opened or closed. However, such stop or limiting means cannot be applied directly to a valve at intermediate or partially opened positions because such means would then interfere with movement or travel of the valve beyond the stop means. There are many situations, as for example when a valve is used to meter fluid flow, in which it is necessary that the valve be accurately positioned at some position intermediate its full range of travel, while remaining free to continue movement.

Knowledge or awareness of the position of the valve should be readily available at all times and, consequently, it is desirable that the position of the valve should be indicated visually. When the valve is remotely controlled, it is especially desirable that such position indication be present at the remote control station either in addition to or instead of the indicating means located at the valve.

The valve operator of U.S. Pat. No. 3,203,266 may only be used with a multiple orifice-type valve which is fully closed by a turning of its stem of ninety degrees. The use of control valves of the needle and seat type require not only more torque to adjust their flow, but also more revolutions of the stem.

SUMMARY OF THE INVENTION

The present invention relates generally to valve actuators and more particularly to an improvement in valve actuators having ratchet mechanisms for rotating valve stems in two directions.

The valve actuator disclosed in U.S. Pat. No. 4,180,238 provides precise repeatable position control of the associated valve having a movable stem and fixed seat. The actuator ratchets rotate the valve stem in uniform steps or arc increments in either direction which precisely positions through repeated cycles of actuator operation the valve closure element relative to the seat for regulating or metering the fluid flow. In the improved ratchet actuator of the present invention, precise control of the stem movement is maintained through many repeated cycles of operation with a simplicity and ruggedness of construction that assures a long operating life and a minimum of maintenance requirements. Such features are extremely desirable in remote operation of the valve while the latter is a desirable trait to assure economic feasibility of the valve actuator.

To achieve these desired results, the coupling connection or linkage of the ratchet actuator to the actuating cylinders is arranged to normally disengage to minimize ratchet mechanism damage or failure should the valve stem move, drift or otherwise change its position to affect ratchet alignment. The operable coupling of the ratchet pawl to the rotatable shaft is made independent of the power stroke to avoid damage during the operating stroke. Such connection linkage is also the most likely source of a malfunction or mechanical jamming of the actuator when actuated. To eliminate both of these problems, the mechanism is simplified and made extremely rugged and durable.

DESCRIPTION OF THE PREFERRED EMBODIMENT

Figure 1:
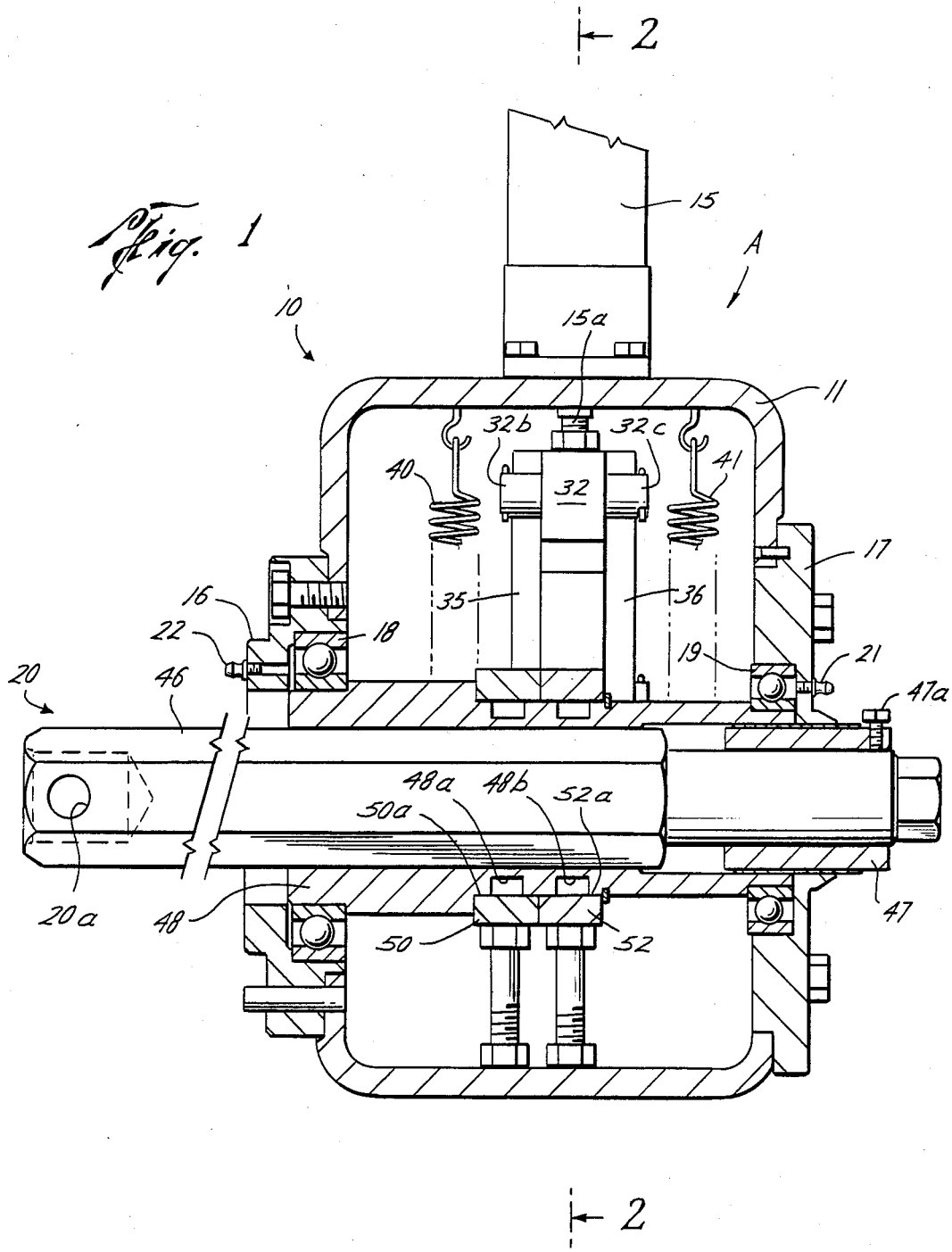
FIG. 1 side view, in section, of the heavy duty ratchet type actuator mechanism of the present invention.

In order to achieve a complete understanding of the present invention, it is necessary and helpful to first understand the operation of control valves which are adjusted by the rotation of a stem by the actuator of the present invention. Such control valves employ an internal fixed annular seat ring which is sealed to the valve housing for directing the fluid flow to be controlled or metered through the center of the seat ring. The stem forms or carries a closure element which sealingly engages the seat ring to close off flow when the stem is rotated to the closed position. Interengaged helical thread means are normally provided on the stem and valve housing to provide longitudinal movement of the stem upon rotation of the stem relative to the valve housing. As the stem is rotated from the closed position the closure element is moved by the longitudinal movement of the stem from sealing engagement with the seat ring to enable flow. In certain flow regulating types of valves, the incremental spacing of the closure element from the seat provides uniform increments in flow through the valve. Such valves are said to have linear flow response or characteristics to stem movement and in flow metering or regulating applications, it is a highly desired characteristic.

U.S. Pat. No. 2,684,688 entitled "Automatic Valve and System," issued to Homer G. Thornhill on July 27, 1954, discloses a valve having a valve body with a threaded inlet adapted to be connected to a side arm of a christmas tree manifold. The valve body also has a flanged outlet adapted to be connected to a positive choke which leads the pipeline going to the storage tank. The valve body is in the shape of a T, the inlet being at the base of the T, and the outlet being in one of the arms of the T. Through the other arm of the T valve body projects the valve stem on which is mounted the valve closure element which cooperates with a removable valve seat threadedly supported within the outlet. The valve stem is slidably supported within the center of the arm of the T opposite the outlet by means of a flanged valve bonnet. The valve bonnet is sealed to the end of the valve body by means of a ring gasket and is secured thereto by means of a fast coupling.

Other pertinent patents include U.S. Pat. Nos. 3,166,092; 2,227,297, 2,684,689, 3,049,140; and 3,166,093. All of these patents teach valves which have valve closure members which are conically shaped and which are adapted to be sealingly inserted into a valve seat or sealing member. These types of valves are generally referred to as needle and seat choke type valves.

The present invention is an improvement in bi-directional valve actuators with a ratchet mechanism for use in combination with a control valve which includes a rotatable stem which, when turned, adjusts the flow through the control valve. Referring to the FIGS., the bi-directional valve actuator apparatus, generally designated A, includes a frame or housing, generally designaged 10, which is mechanically coupled or mounted to the associated control valve (not illustrated) adjacent to the operating stem thereof.

Figure 2:
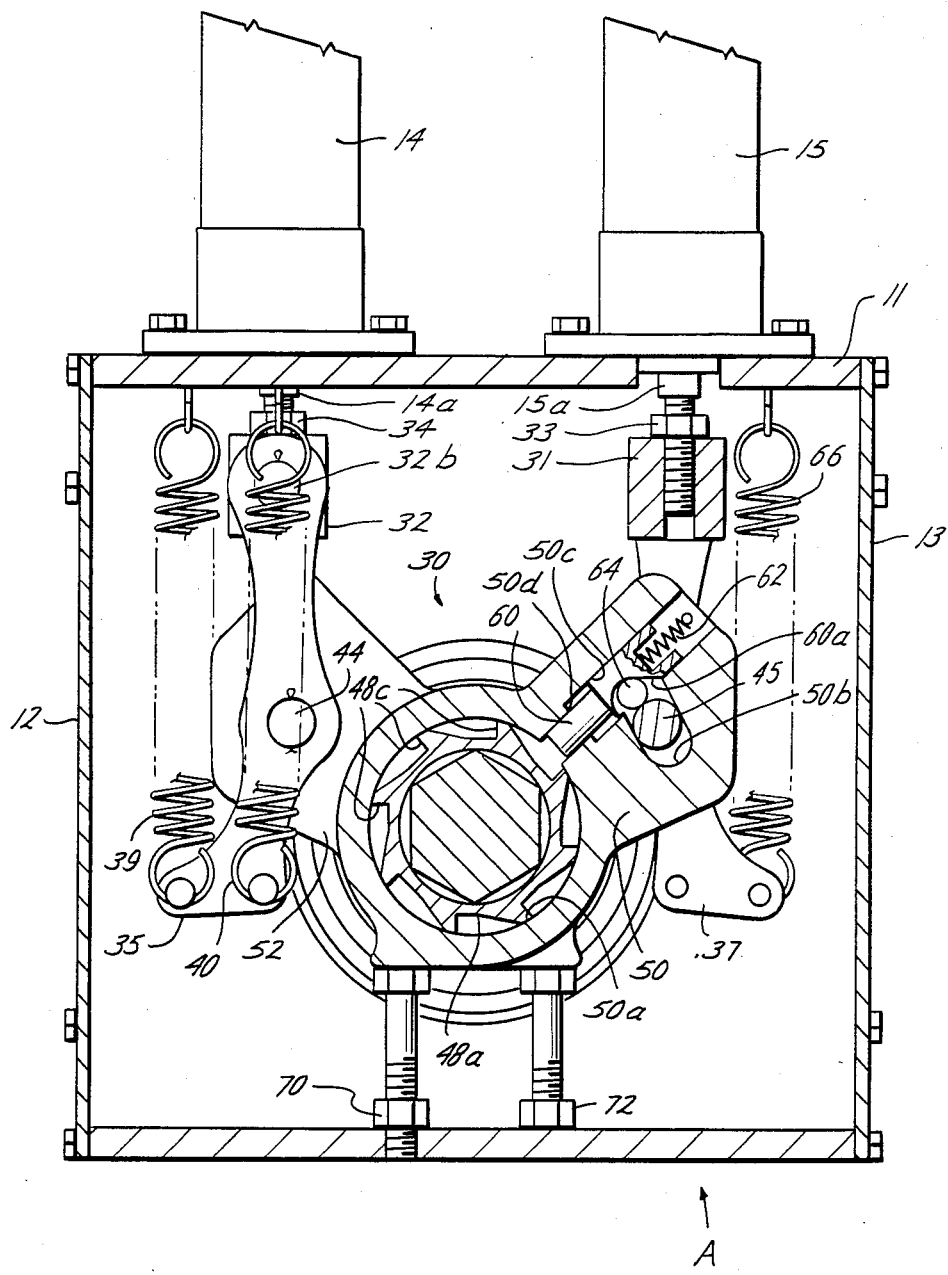
FIG. 2 is an end view taken along line 2—2 of FIG. 1.

As is best illustated in FIG. 2, the housing 10 includes an enclosed weatherproof casing 11 having removable opposite side cover plates 12 and 13 which provide acces to the sealed interior of the housing 10 for maintenance and assembly purposes. Secured directly to the exterior of the casing 11 for simplification of assembly and ruggedness of design purposes is a pair of operating cylinders 14 and 15. The operating cylinders 14 and 15, which are well known and commercially available from many suppliers, are preferably of the single acting type having reciprocating piston operating rods 14a and 15a extending from the cylinders 14 and 15, respectively into the casing 11.

Extending through and mounted with the removable housing end plates 16 and 17 (FIG. 1) is the valve stem operating shaft means or assembly 20. Each of the end plates 16 and 17 mounts a ball bearing race 18 and 19, respectively, that engages and rotatably mounts the shaft assembly 20 for enabling its rotation relative to the casing 11 while providing annular shoulders to prevent any movement of the shaft assembly 20 from the casing 11 in the direction of the longitudinal axis of the shaft assembly 20. For maintenance and assembly purposes, the end plates 16 and 17 are also releasably secured and sealed to the casing 11 to enclose the interior of the housing 10. Grease fittings 21 and 22 carried in end plates 17 and 16, respectively, provide the means for lubricating ball bearings 19 and 18 to provide ease of rotation of shaft assembly 20 in the usual manner.

As will be described in detail, the shaft assembly 20 is connected with the operating cylinders 14 and 15 for converting the power stroke reciprocating movement of the piston rods 14a and 15a into controlled rotation of the shaft means 20 by the ratchet means, generally designated 30. As will also be described, the shaft assembly 20 is connected with the valve stem for transmitting the rotary movement thereto.

The ratchet means 30 includes a pair of piston rod connectors 31 and 32 (FIG. 2) having threaded openings 31a and 32a, respectively, receiving and adjustably securing with threaded end portions of piston rods 15a and 14a. Adjustable lock nuts 33 and 34 secure and maintain the adjustable connections in fixed relationship in the usual manner. As illustrated in FIG. 1, the connector 32 has a pair of lugs 32b and 32c disposed on opposite sides which are used to pivotally secure a pair of parallel operating links 35 and 36. The connector 31 is provided with a similar pair of links of which only the link 37 is illustrated (FIG. 2), but which operates in the same manner as to be described with respect to links 35 and 36.

The link 35 is connected with a pair of springs 39 and 40 having one end anchored to the casing 11 which urges the link 35 to move or reciprocate toward the operating cylinder 14. The springs 39 and 40 provide means for retracting the piston rod 14a back into the operating cylinder 14 when fluid pressure in the operating cylinders 14 and 15 is reduced. A similar pair of springs, of which only 41 is illustrated (FIG. 1), urge on the link 36 for also moving the piston rod 14a back into the cylinder 14. This provides a total of four springs arranged to return the piston rod 14a to the cylinder 14. Each of the two link members associated with connector 31 are also each provided with a pair of redundant springs. As described, each of the operating links is provided with redundant springs to enhance reliability of operation. Thus operating reliability of the actuator is greatly increased.

The central portion of each of the pair of links 35 and 36 is provided with an opening for receiving an operating pin 44. An operating pin 45 is similarly disposed in the other set or pair of operating links 37, both sets of links being selectively connected or coupled to the shaft assembly 20 for effecting operating rotation thereof.

The shaft assembly 20 connectable with the valve stem by transverse opening 20a formed in one end of a central shaft 45 having a polygon cross section shaft portion that terminates between the ball bearing races 18 and 19 (FIG. 1). A collar 47 secured to the other end central shaft 46 by set screw 47a is mounted on the portion of the central shaft 46 extending from the polygon cross section portion. Surrounding the central shaft 46 and collar 47 is an elongated tubular ratchet bushing or drive collar 48 that is secured to the shaft 46 by the polygon cross-section to prevent relative circumferential rotation therebetween. The outer ratchet bushing 48 engages the ball bearing races 18 and 19 for rotatably mounting the shaft assembly 20 with the casing 11 in the usual manner.

The outer bushing 48 has a plurality of two spaced annular ratchet operating recesses or paths 48a and 48b formed thereon. The ratchet path 48a has a plurality of circumferentially spaced operating engagement shoulders 48c (FIG. 2) while the path 48b has a corresponding plurality of oppositely facing engagement (not illustrated) for rotating the ratchet bushing in an opposite direction to the shoulder 48c.

Disposed exteriorly of the operating path 48a and 48b and circumferentially rotatable relative thereto are ratchet operating crank members 50 and 52, respectively, that are mounted concentrically about the bushing 48 using openings 50a and 52a. A radially extending flange section is formed on each of the crank members 50 and 52 to provide a slotted opening (50b illustrated in FIG. 2), for receiving connection pins (45 illustrated) carried by operating links 35, 36 and 37. The crank members 50 and 52 receive the reciprocating power stroke movement of the operating cylinders 14 and 15 from the links 35, 36, and 37 and aid in converting or changing such movement into rotation of the drive bushing 48 and central shaft 20. To convert the reciprocating motion, a ratchet pin and spring assembly different from and more reliable than that disclosed in my U.S. Pat. No. 4,180,238 is employed.

As disclosed in FIG. 2, the crank 50 is provided with a passage 50C that extends radially from the opening 50a for intersecting slotted opening 50b. The passage 50c is provided with an annular movement shoulder 50d which engages a corresponding shoulder on a ratchet pawl plunger 60 that is movably disposed in the opening 50b. The ratchet pawl 60 is longitudinally movable between a free position illustrated in FIG. 2 where it is spaced from the ratchet bushing operating path 48a and an operating position where it engages the operating shoulder 48c of the operating path 48a for cranking or rotating the ratchet bushing 48. A biasing spring 62 secured in the opening 50c urges the pawl 60 to the operating position independently of the power stroke of the operating cylinder 15. As operation of the spring 62 is independent of the operating power stroke of the cylinder 15, the spring 62 may be controlled to be much weaker and less likely to damage the pawl 60 or operating path 48a.

The pawl 60 is provided with a recess 60a adjacent the slotted opening 50b which receives a return roller or member 64 having a length approximately equal to the width of the crank 50 to enable free movement in the slot 50b. When the operating pin 45 is moved downwardly into engagement with the slot 50b, the return roller 64 moves or drops from the recess 60a to enable the spring 62 to move the pawl 62 into coupled operating engagement with the shoulder 48c formed by the operating path 48a of the driver collar 48. Thereafter, further power stroke reciprocating movement of the pin 45 by cylinder 15 will rotate the crank 50 and coupled drive collar 48 through a predetermined arc.

When the operating pressure in the cylinder 15 is reduced, the springs urging on the links secured to the connector 31 move the pin 45 upwardly in the slot 50b. This initial movement forces the return roller 64 into engagement with the recess 60a of the pawl 60 to move the pawl 60 to the free position spaced from engagement with the drive collar 48. This effectively uncouples the crank member 50 from the drive collar 48 and enables rotation of the crank member 50 back to the initial position illustrated in FIG. 2. Crank 52 is provided with a similar working mechanism that operates in the same manner, but in the opposite direction to provide for rotation of the valve stem in either direction. Adjustable bolts 70 and 72 mounted with the casing 11 provide return movement limit stops for the cranks 50 and 52, respectively.

USE AND OPERATION OF THE PRESENT INVENTION

In the use and operation of the present invention, the valve actuator is assembled in the manner illustrated and mounted with the valve to be operated. The shaft opening 20a is used to connect with the associated valve stem to transmit the rotation in the usual manner.

When it is desired to operate the valve, working fluid under pressure, usually hydraulic, is introduced into one of the operating cylinders arrange to provide opening rotation to the valve stem. The fluid pressure urges on a piston (not illustrated) to extend the piston rod from the cylinder in a power stroke. Such movement overcomes the urging of the link springs for reciprocating the associated links.

Reciprocating movement of the links will move the associated operating pin and roller to release the pawl 60 and enable the spring 62 to move the pawl 60 to operably engage and rotate the drive collar 48 through a preselected arc. Rotation of the drive collar 48 also rotates the stem of the valve for effecting valve operation.

Reduction of fluid pressure in the operating cylinder completes the cycle of operation and enables the plurality of springs to return the operating links and operating cylinder piston to the initial position. Upon return of the operating cylinder piston to the initial retracted position, the actuator assembly is ready for another cycle of operation. The actuator may be repeatedly cycled until the valve is opened a sufficient amount to permit the desired flow.

When it is desired to close the valve, fluid pressure is introduced into the other operating cylinder to rotate the stem in the other direction in a similar manner. A like number of cycles of operation in that direction will close the valve.

While the preferred embodiment illustrated and described herein utilizes single acting operating cylinders for the actuating mechanism, it is to be understood that the present invention is not to be considered so limited. Double acting operating cylinders that utilize operating fluid for controlling piston rod movement in either direction as well known may also be used. If double acting cylinders are provided, the return springs may be dispensed with if desired. The double acting cylinders, like the single acting cylinders, may use a wide range of operating fluids to supply the control operative force to the cylinders.

The foregoing disclosure and description of the invention are illustrative and explanatory thereof, and various changes in the size, shape and materials, as well as in the details of the illustrated construction may be made without departing from the spirit of the invention.

I claim:

1. A bi-directional valve actuator with a ratchet mechanism adapted for use in combination with a control valve which includes a rotatable stem which, when turned, adjusts the flow through the control valve, said bi-directional valve actuator comprising:
   a frame adapted for mounting with a control valve adjacent the rotatable stem thereof;
   a shaft means rotatably mounted with said frame, said shaft means mechanically coupled to the stem of the control valve for effecting rotation of the stem in response to rotation of said shaft;
   said shaft means having a first ratchet operating path and a second ratchet operating path spaced from said first operating path;
   a first pawl having a first end and a second end, said first pawl mounted for longitudinal reciprocating movement toward said first ratchet operating path on said shaft means to a coupling position during an operating stroke of said first pawl and away from said first ratchet operating path on said shaft means to an uncoupled position;
   means for coupling said first end of said first pawl to said first ratchet operating path during the operating stroke of said first pawl and for uncoupling said first end of said first pawl from said first ratchet operating path during a return stroke of said first pawl;
   a first hydraulic cylinder mounted with said frame, said first cylinder having a first piston operably coupled to said first pawl to effect engagement with said first ratchet operating path to rotate said shaft means;
   a first pair of link members mechanically coupled to said first piston for operably coupling with said first pawl for transmitting movement of said first piston to said first pawl;
   a first pair of springs each of which is mechanically coupled at one end to said frame at the other end and to one of first pair of link members;
   a second pawl having a first end and a second end, said second pawl mounted for longitudinal reciprocating movement toward said second ratchet operating path on said shaft means to a coupling position during an operating stroke of said second pawl and away from said second ratchet operating path on said shaft means to a disengaged position;
   means for coupling said first end of said second pawl to said second ratchet operating path during an operating stroke of said second pawl and for uncoupling said first end of said second pawl from said second ratchet operating path during a return stroke of said second pawl;
   a second hydraulic cylinder mounted with said frame, said second cylinder having a second piston operably coupled to said second pawl to effect engagement with said second ratchet operating path to rotate said shaft means;
   a second pair of link members mechanically coupled to said second piston for operably coupling with said second pawl for transmitting movement of said second piston to said second pawl;
   a second pair of springs each of which is mechanically coupled at one end to said frame and at the other end to one of said second pair of link members;
   said means for coupling said first pawl and said second pawl each having an urging means for reciprocably moving said first end of each of said pawls into coupling engagement with said associated ratchet operating path, said first pair of springs operating said first pawl for overcoming said urging means associated with said first pawl for reciprocably moving and normally maintaining said first pawl spaced from said first ratchet operating path, said second pair of springs operating said second pawl for overcoming said urging means associated with said second pawl for reciprocably moving and normally maintaining said second pawl spaced from said second ratchet operating path;
   said means for urging said first pawl and second pawl into coupling engagement with said shaft means are independent of said operating cylinder to avoid binding of said pawls and said operating paths upon coupling during the power stroke of each of said pawls; and
   said means for coupling said first pawl and said second pawl each having an associated retainer member for reciprocably moving said first end of each of said pawls from coupling engagement with said associated ratchet operating path in the absence of the operating stroke of said pawls to protect said pawls from inadvertent movement of said shaft means.

2. The valve actuator of claim 1, wherein:
   said means for coupling said first end of said first pawl including a first crank member rotatably mounted with said shaft means adjacent said first operating path, said crank member mounting said first pawl and said urging means for said first pawl;
   said first pair of link members connected with said first crank member for rotating said crank member when said first piston is extended from said first cylinder;
   a first return member moving said first end of said first pawl from engagement with said first ratchet operating path when said first crank member is rotated about said shaft means by said first piston retracting into said first cylinder.

3. The valve actuator of claim 2, wherein:
   said means for coupling said second end of said second pawl including a second crank member rotatably mounted with said shaft means adjacent said second operating path, said crank member mounting said second pawl and said urging means for said second pawl;

said second pair of link members connected with said second crank member for rotating said crank member when said second piston is extended from said second cylinder;
a second return member moving said second end of said second pawl from engagement with said second ratchet operating path when said second crank member is rotated about said shaft means by said second piston retracting into said second cylinder.

* * * * *